United States Patent [19]

Hodgson

[11] Patent Number: 5,551,380
[45] Date of Patent: Sep. 3, 1996

[54] DOG TEACHING LEAD AND METHOD

[76] Inventor: Sarah Hodgson, 21 Branch St., Goldens Bridge, N.Y. 10526

[21] Appl. No.: 379,938

[22] Filed: Jan. 27, 1995

[51] Int. Cl.⁶ .................................................. A01K 27/00
[52] U.S. Cl. ......................................................... 119/795
[58] Field of Search .................................. 119/795, 797, 119/798, 769, 788, 792

[56] References Cited

U.S. PATENT DOCUMENTS

| 2,861,547 | 11/1958 | Dale | 119/798 |
| 4,763,609 | 8/1988 | Kulik | 119/798 |

FOREIGN PATENT DOCUMENTS

| 634446 | 3/1950 | United Kingdom | 119/795 |
| 784166 | 10/1957 | United Kingdom | 119/795 |
| 2039705 | 8/1980 | United Kingdom | 119/795 |

*Primary Examiner*—Thomas Price
*Attorney, Agent, or Firm*—Eliot S. Gerber

[57] ABSTRACT

A dog leash teaching lead is used to teach a dog to behave in the house and outside. At its outer end (distal end) the leash has a fastener clip which attaches the leash to the dog's collar. A station hole, about 3–7 inches from the fastener clip, is used to attach the dog to a post or other object. A series of from 3 to 7 waist holes, near the proximal end (the owner's hand) are used to attach the dog to its owner or the owner's family members. An end fastener clip, at the proximal end, may be connected, alternatively, to the station hole or one of the waist holes or a ring held by the leash.

13 Claims, 2 Drawing Sheets

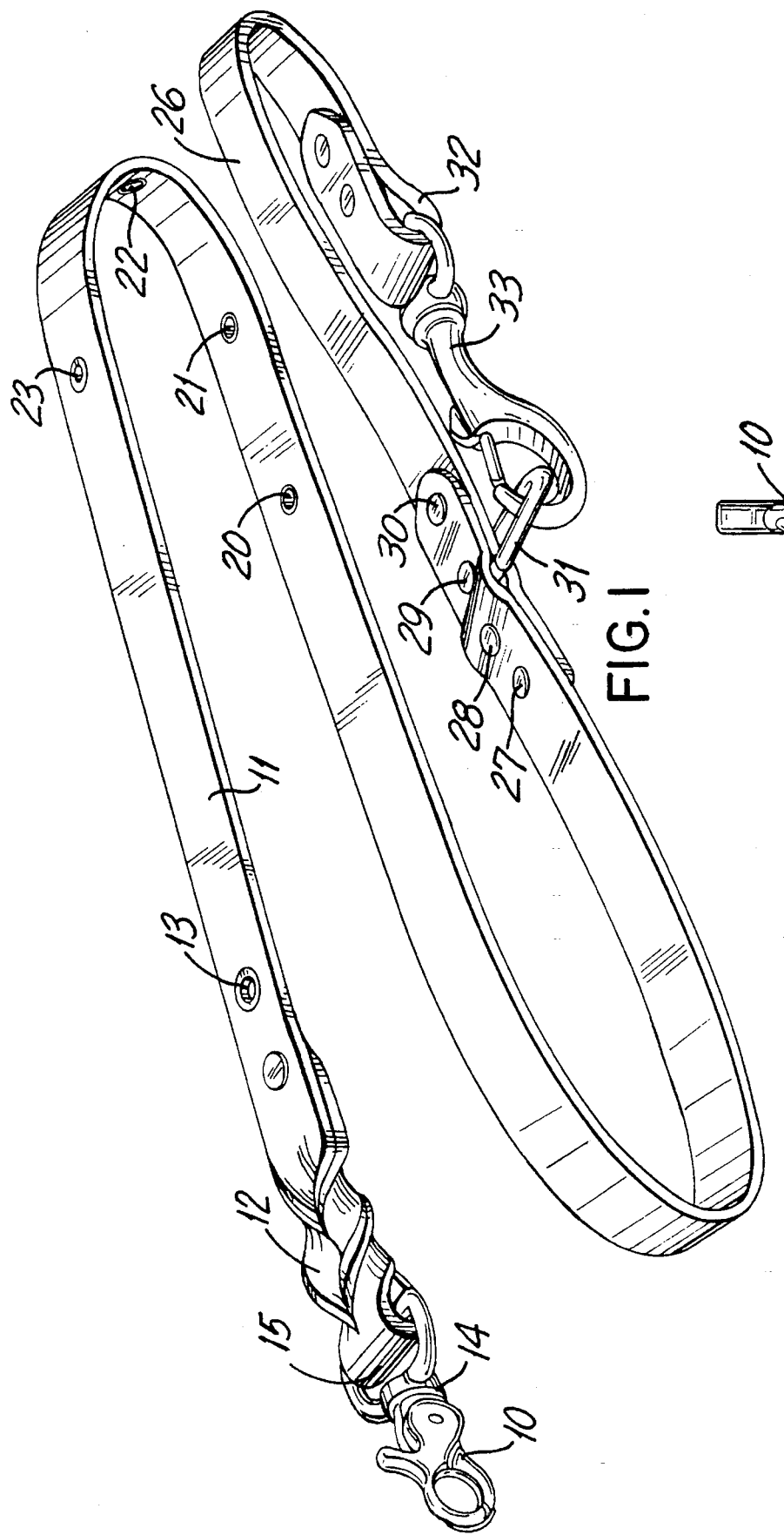
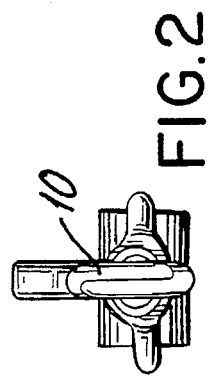

5,551,380

DOG TEACHING LEAD AND METHOD

BACKGROUND OF THE INVENTION

1. Field of the Invention

The present invention relates to dog leashes and dog training methods and more particularly to dog leashes used for dog training and methods of dog training using such leashes.

2. Related Art

At the present time a "crate", a small mesh enclosure, for example 4 feet square, is used to contain pet dogs. The theory behind the crate is sound as the crate contains the dog when its owner is unable to watch him. The crate discourages soiling accidents at night or during the owner's absence because dogs do not generally like to mess in a confined area. Few dogs object to the crate and they like the security of a small sleeping area.

However, a crate has drawbacks. It separates the owner from his dog when the owner is at home. It can't teach the dog to behave in all rooms of the house. It doesn't encourage obedience when the dog is out of the crate. A crate is a preventative measure and is not a teaching tool.

In most situations, crates are a good investment. They are best used to (i) encourage sleep when the owner leaves the house for errands (up to four hours); (ii) create good sleeping habits with young puppies or new dogs; and (iii) make a "time-out place" for over-stimulated dogs.

It is also presently known that leashes may be used to walk dogs and to train dogs. Generally such leashes consist of an elongated leather or metal chain member having a loop handle at one end and a fastening clip at the opposite end. The clip may be removably attached to a ring on a collar around the neck of the dog. Some shorter leashes of the same general construction are considered "training leashes" because they may be used in connection with training a dog to perform various obedience commands, for example, "heel" (follow closely) or "sit" (sit on two rear legs).

SUMMARY OF THE INVENTION

In accordance with the present invention there is provided a specially designed dog leash and a method of dog training which relies upon that leash.

The leash is an elongated member preferably of coach grade cow leather. At its outer end (distal end—the end attached to the dog) the leash has a fastener clip which is used to attach the leash to a ring on the dog's collar A "station hole", a hole about 3 inches from the clip, is used to attach the leash, and the dog, to a fixed object, such as a post. The leash also has a series of "waist holes" near the proximal end (the end near the owner's hand). The waist holes are used to position a dog near the side of its owner or the owner's family members. A "leash loop" is an extension leash section connected to the main body of the leash. An "end clip" at the proximal end (the end near the owner's hand) is used, with the appropriate holes, to create the station leash arrangement or owner's side leash arrangement. The leash as a whole is referred to herein as the "teaching lead".

Preferably the teaching lead is accompanied, when sold, with a training booklet. That booklet, and the teaching lead of the present invention, permits the dog owner to use the teaching leash to:

(i) take the place of a crate when the owner is at home;
(ii) housebreak the dog or puppy;
(iii) discourage nipping and jumping;
(iv) encourage good chewing habits;
(v) calm the dog around company;
(vi) further advance obedience; and
(viii) gain outside walking control.

The teaching lead is a sturdy leather leash with a plurality of holes. Leather is the best thing an owner can put between himself and his dog. Easy to hold, a leather leash will soften under constant use and provide much greater leverage when trying to control an excited dog.

The station hole, four or five waist holes, two clips and a leash loop make the teaching lead unique. The holes allow quick and convenient handling. Whether rehabilitating an older dog or conditioning a young puppy, the teaching lead will enable the dog owner to communicate effectively and humanely. Instead of preventing difficulties by isolation, he will be able to teach his dog how to behave in every situation.

BRIEF DESCRIPTION OF THE DRAWINGS

In the accompanying drawings:

FIG. 1 is a perspective view of the teaching lead of the present invention;

FIG. 2 is a front end view of the teaching lead of FIG. 1;

DETAILED DESCRIPTION OF THE INVENTION

Figure 3:
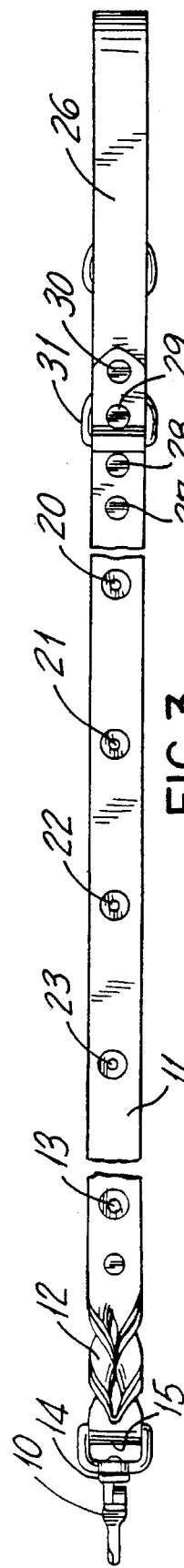
FIG. 3 is a top plan view of the teaching lead of FIG. 1.
Figure 4:
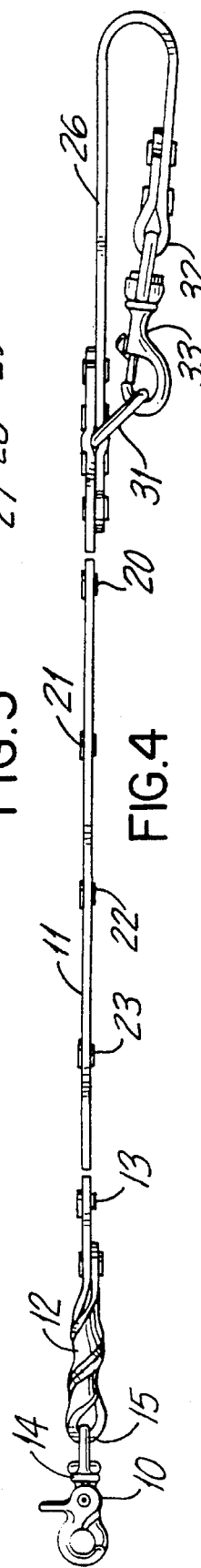
FIG. 4 is a right side plan view of the teaching lead of FIG. 1.
Figure 5:
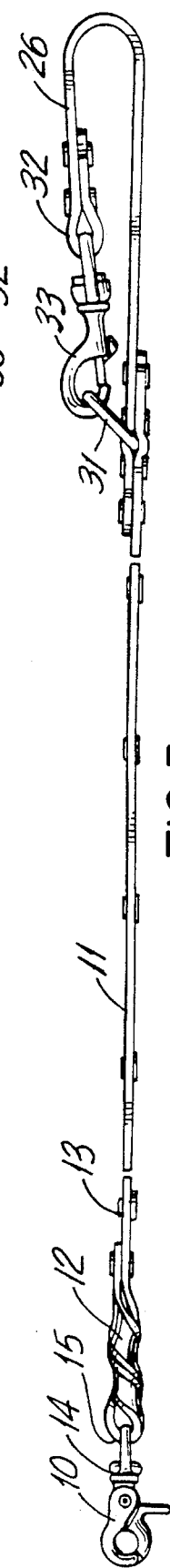
FIG. 5 is a left side view of the teaching lead of FIG. 1.
Figure 6:
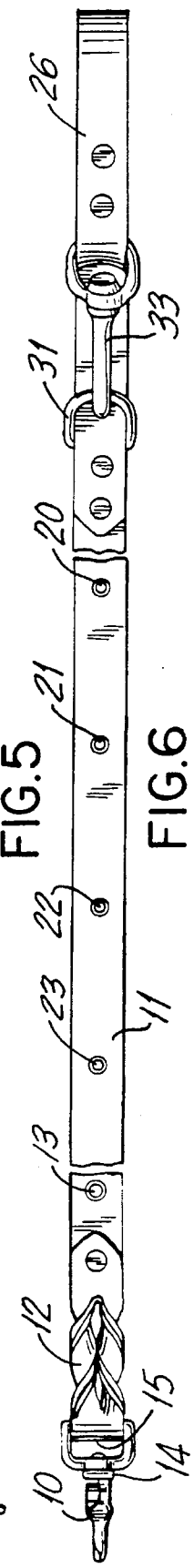
FIG. 6 is a bottom plan view thereof.

As shown in FIGS. 1–6, the teaching lead (leash) of the present invention comprises two elongated portions. Preferably the leash is made from coach grade cow leather.

A dog clip (fastener) 10, which includes a swivel mount 14, is connected at the outer end of the main leash portion 11 and is secured thereto by the leash fastening loop 12. A "station hole" 13, whose use is described below, is a through aperture and is positioned preferably in the range of 3–7 inches, preferably about 4.5 inches, from the distal end 15 of the main leash portion 11. The main leash portion is preferably about 4 feet, 10 inches long. The main leash portion has preferably three to seven through-hole apertures 20–23, most preferably four or five such apertures, which are "waist holes". The main leash portion 11 is riveted to leash extension portion 26, whose outer end is the proximal end of the leash, by rivets 27–30 which captures a ring 31. The ring 31 is in the range of 8 to 14 inches from the proximal end. A loop 32 is formed at the inner end (proximal end) of the extension portion 26 by two rivets. The loop captures an end clip (fastener) 33 which includes a swivel mount. The clip fasteners are conventional spring-loaded fasteners of the type generally used on dog leashes, or alternatively "coach" bag type fasteners (opposite "C" shaped prongs hinged together).

The teaching lead has two applications: Leading and Stationing. Leading is the process in which the dog walks at the owner's side and follows the owner's directions. Stationing refers to training the dog to stay comfortably in the selected room areas. Some days the owner will do more leading than stationing and other days he may find that the dog is stationed a large percentage of the time.

When introducing a dog to a house, he is kept on the teaching lead by using one of the two applications. Until he behaves, he is given freedom in a gated "dog proofed" room or in a fenced enclosure.

The teaching lead should be used on dogs which meet this check list.

(i) The dog must be at least 12 weeks old;

(ii) The owner must be able to read the dog's "elimination signs";

(iii) The owner must be able tell when the dog is too excited to sit still;

(iv) There must be a planned feeding schedule;

(v) The owner must dog-proof his house.

Even at twelve weeks dogs have a lot of needs that override the teaching lead. If the dog is hungry, needs to eliminate or is wild with energy, the owner will need to take a break and provide for the dog's needs.

I. LEADING

"Leading" describes the process of connecting the dog to the owner's side because it communicates leadership. It is a passive and fun way to show the dog around and let him know who's boss. In families everyone can take turns.

The dog must be at least 12 weeks to begin this process. The dog must be familiar with his leash. It should not be used in place of exercise; leading does not take the place of a run.

In use, the owner slides the main leash portion around his waist like a belt. It should be put around the left side, if one wants the dog on the left, or right side if one wants him on the right. Everyone in the family must keep the same side. The end loop is connected to the appropriate waist hole. If the leash is too big for children's waists, they can wear it like a banner across the chest.

Until the dog is 16 weeks, the regular buckle collar should be used. If the dog is older than 16 weeks he is ready for a training collar. A local pet store, a training instructor or veterinarian will help one find the collar best suited for the owner and his dog.

Where the owner goes, so goes his dog. All decisions begin with the owner—this is his chance to communicate leadership. The owner is teaching the dog to follow him, so if there is a conflict of interest (the dog wants to go left when the owner is going right) the owner should go his way and encourage the dog along.

While connected, the following commands should be used conversationally. Encourage everyone handling the dog to use them as well.

1. "Name, Let's Go!' This command is used when walking or changing direction.

2. "Sit" This command is used when offering the dog something positive like food, praise, a toy or a pat.

3. "Name" A few times each day, the owner should stand in front of the dog (back straight) and call out his name. If the dog does not look his eyes should be directed upwards with a finger and a clucking sound.

4. "Wait" and "OK" These commands are used to stop the dog at doors, stairs and other important thresholds such as the car and the veterinarian's office. The owner should command "WAIT" and bring the dog behind him.

5. "Excuse Me" This is used whenever the dog crosses in front or behind the owner. Also, this is used this if the dog presses against the owner or blocks his path.

Anchoring: Whenever the owner sits down (to talk on the phone, do homework or watch TV) he should slide the end clip around to his tail bone and sit on the remaining slack of the leash. Enough room should be left for the dog to lie comfortably behind the owner's feet. The dog should be given a bone and encouraged to be still by petting him when he does so.

Taking a break: If the owner feels like taking a break, he can do two things: have interactive play time (off leash) in a fenced enclosure or gated area, take him out on a flexi-leash, or station him (make sure the dog's bladder is empty). There will be days when the owner stations much more than leads. Both methods are interchangeable. One should not be alarmed by the dog's energy spurts. It is normal and usually fun. If the dog gets too riled up and starts to jump at the owner, to correct the dog the owner should attach a short leash to his buckle collar.

If the dog won't move it is likely that the dog is hoping the owner will rush back and give him lots of attention. This should be avoided. There are two alternatives:

1. The owner should keep walking and not turn around. He may praise the air in front and walk a little faster. When the dog catches up, the owner should praise him happily and continue. This method works well with large breeds who have a record of being stubborn.

2. If one has a more delicate breed, the owner should kneel down in front of him when he puts on the brakes and tap the floor and encourage the dog to come to him.

II. STATIONING

For stationing, the dog must be at least twelve weeks old. The station should be away from stairs, electrical cords/outlets or entanglements. The object should be immovable, sturdy and unable to tip. When securing the dog, one should attach the dog to the buckle or tag collar, never a training collar.

Stationing lets one take the dog into every room he's permitted in, and shows him how to behave in that room. The following steps are used in stationing:

1. Pick an area: The owner selects a small area or corner in each room the dog will be allowed in. This will be the dog's station and eventually he'll go there automatically. Initially, one must secure him in his area with the training lead.

2. Secure the dog: The owner secures the dog at his station by wrapping the teaching lead around an immovable object and attaching the double-headed clip into the station hole at the opposite end of the leash. Alternatively, one can screw an eye bolt into the wall and clip the leash to it. When stationed, the dog should have no more than 3 feet of freedom.

When first practicing this procedure the owner should stay with the dog. The owner should make him feel comfortable with the area and encourage him to chew his bone. Initially the owner should leave only when the dog is busy with a chew toy and bravely ignore whining or barking (unless he's communicating a need to eliminate) and return to him when he's settled down. Soon the owner will be able to hook him up and leave immediately. Whenever possible, someone in the family should reinforce good behavior at a station by praising or petting the dog.

3. Keeping close: The dog wants to be with the owner or another family member whenever they are around. The point of stationing is to allow the dog to be with the owner while teaching him how to behave in social situations. The dog should be stationed in a room with people.

4. Giving direction: Whenever the owner leads the dog to his station, he/she should command "SETTLE DOWN" and point to the spot.

5. Station good things: A comfortable cushion or blanket and a favorite chew toy will help the dog identify his space. The owner may ask a veterinarian for suggestions. Avoid rawhide bones with big knots—they can cause indigestion and other problems. One may purchase and use a product like "Bitter Apple" (™) to discourage test-chewing on the surrounding furniture.

6. Giving attention: An unsupervised dog often gets attention for being naughty. On the other hand, a stationed dog cannot cause too much trouble. Instead of having to run around scolding him, the owner can love and praise him warmly whenever he is calm or chewing a bone.

There can be two stations or twenty. The owner may create a station in every room in which the dog will be welcome and also have outside stations and one in the car.

The teaching lead is only temporary. Initially it is used to create good habits that will eventually apply off-leash when the dog is housebroken and in control of his excitement and chewing habits.

How long a dog can be stationed depends on the dog. A sleepy dog of any age can handle an hour or more. An older dog can handle more extended periods. The best gauge is the dog—keeping him stationed near the owner, allows him to be aware of his signals. If a pup has been napping at his station for an hour and suddenly gets up and starts acting restless, it is probably just bathroom time. If one has a puppy who suddenly starts acting like a Mexican jumping bean, it is probably an energy spurt and time for a little play.

If the dog panics, the owner must determine if his reaction is really panic or simply a persuasive protest. The owner should ignore the protest. If the dog is truly panicked, he should be initially stationed when someone can sit with him.

If the dog chews the leash, one may put Bitter Apple (™) paste on the leash. This substance enhances the leather and discourages leash mouthing. If Bitter Apple (™) is not effective, one may mix some red pepper juice with a little garlic and spread it on. One may also try soaking the leash overnight in Liquid Bitter Apple (™). If all else fails, the owner may purchase a chain lead and temporarily station him on that.

If the dog barks, the owner must determine if he needs to eliminate or has some other pressing need. If it's neither, the dog can be ignored. The owner should release a dog from a station once he's calm and quiet.

There is no need for the owner to unstation him if leaving the room for a few minutes. Short departures are good because they get the dog used to being left alone and show him that he will not be deserted.

III. USING THE TEACHING LEAD TO SOLVE OTHER PROBLEMS

As to housebreaking, the teaching lead follows the same logic as the crate: dogs don't like to mess in a confined area. By keeping the dog connected or stationed, an owner will be aware of the dog's needs and know when he must go out. The owner will quickly learn his "I've gotta go bad" signal!

Jumping should be discouraged. Some people advise that you knee or step on a dog's paws when he jumps on a person. Aside from being potentially painful, it's usually ineffective because both actions are interpreted as interactive.

With the teaching lead, the owner can handle jumping behavior without touching the dog. If he jumps up, the leash should be grasped and the dog snapped down with the correction "OFF" said in a very firm tone. The owner should not look at the dog or touch him until he calms down. When he does, the owner should command "SIT" and give him attention.

When company arrives, the owner should station the dog where he can observe but not influence the situation. When he settles down, the owner connects the dog to himself and encourages the guests to pet him only after he is calm. If the dog jumps, the owner should correct him as outlined above. When the owner sits down, he should sit on the leash (anchoring) and give him a chew bone.

Any time the dog is mouthing (nipping) anyone, the owner should snap his head from the person's hand and say "NO". If one pulls one's hand away or pushes the pup, one could inadvertently encourage rougher play.

The owner should encourage good chewing habits by finding a bone or similar chew toy that the dog likes. The owner should buy the same chew object for every station plus a few extras to keep handy. Too many difficult toys will confuse the dog. Each time the owner gives the dog his bone, he should say "WHERE'S YOUR BONE?"

Any time the dog shows interest in an inappropriate object, the owner should pull him back by saying "NO". The owner should pick up the offending object and correct it very sternly "BAD SOCK! SHAME ON THE SOCK!", looking at the sock, not the dog. If the dog already has something in his mouth, the owner should tell him to "BRING IT" and praise him when he does and ask "WHERE IS YOUR BONE"?"

One should encourage outside control by connecting the dog to one's side. Every time he gets distracted, the owner should call out his name and scurry in the opposite direction. The owner should praise him immediately, whether he turned voluntarily or was tugged by the leash and continue this until he is attentive when the owner calls out his name.

USING THE TEACHING LEAD FOR ADVANCED OBEDIENCE WORK

Distance control: The station hole of the teaching lead can be used to quickly attach the dog to a tree or post. This enables one to work on distance control or command stationary cues i.e., sit, down or stand, from a distance.

Heeling: Once the dog has mastered a teaching lead heeling exercise, the owner should belt it around his waist and command heel with his hands free. He should use both arms to pat his leg and direct the dog. Body language will help gauge and focus the dog when initially off leash.

Application for professional work: The teaching lead is an attractive professional tool which can be looped around the waist and worn comfortably throughout the day. In a veterinary office, for a dog trainer or groom shop it can eliminate extraneous leashes and the time needed to locate them, as well as giving the appearance of an organized system to control dogs when they must be handled. The leather leash is easy to hold and gives maximum leverage to control even the most unruly pets.

The teaching lead encourages more participation than the crate. It doesn't replace the crate, but it encourages one to train the dog when home, communicate control passively, spend time with the dog and quickly train him to behave in the house.

What is claimed is:

1. A dog leash to teach a dog wearing a dog collar to behave, the leash being adapted to be easily adjusted to different waist sizes, the leash comprising:
   (a) an elongated flexible leash body member having a distal end and a proximal end;
   (b) a first fastener clip means connected at the distal end to connect the leash to a dog collar;
   (c) a station hole through the leash body member and in the range of 3 to 7 inches from the distal end, the station hole being used to removably attach the dog to a post or other object;
   (d) a series of from 3 to 7 waist holes arranged in line, each waist hole being in the range of 25 to 45 inches from the proximal end and the waist holes being adapted to removably attach the leash to a person's waist; and
   (e) a second fastener clip means connected at the proximal end to connect the proximal end to the station hole or alternatively a selected one of the waist holes.

2. A dog leash as in claim 1 wherein the leash body member is of leather.

3. A dog leash as in claim 1 wherein the first fastener clip means and second fastener clip means each includes a swivel mount.

4. A dog leash as in claim 1 wherein said leash body member comprises a main leash portion having the first clip means attached thereto and having the waist holes therethrough and a leash extension portion fastened to the main leash portion and having the second fastener clip means attached thereto.

5. A dog leash as in claim 4 and including a plurality of rivets fastening the main leash portion to the leash extension portion.

6. A dog leash as in claim 5 and including a ring secured on the body member by the rivets, the ring being in the range of 8 to 14 inches from the proximal end.

7. A dog leash as in claim 1 and further including a ring secured to the body member in the range of 8 to 14 inches from the proximal end.

8. A method to teach a dog to behave using a leash, the leash adapted to be easily adjusted to different waist sizes, the method comprising:
   (a) providing an elongated flexible leash body having a distal end and a proximal end;
   (b) fastening a first fastener clip connected at the distal end to a dog collar;
   (c) removably connecting and disconnecting a second fastener clip at the proximal end within a station hole through the leash body member, the station hole being in the range of 3 to 7 inches from the proximal end, the connection within the station hole being used to removably attach and detach the dog, respectively to a post or other object;
   (d) removably connecting and disconnecting the second fastener clip within one of a series of from 3 to 7 waist holes arranged in line, each waist hole being in the range of 25 to 45 inches from the proximal end and the waist holes being used to removably attach the leash to a person's waist; and
   (e) attaching the leash to a dog and to a person for at least 2 hours a day, while the person is sitting and walking, by connecting the second fastener clip within a selected waist hole around the waist of the person and connecting the first fastener clip to the dog collar.

9. A method as in claim 8 and providing the leash body member of leather.

10. A method as in claim 8 and providing the first fastener clip and second fastener clip with a swivel mount.

11. A method as in claim 8 and providing said leash body member with a main leash portion having the first clip attached thereto and having the waist holes therethrough and a leash extension portion fastened to the main leash portion and having the second fastener clip attached thereto.

12. A method as in claim 11 and providing a plurality of rivets fastening said first body member to said second body member.

13. A method as in claim 8 and providing the leash with a ring secured on the body member in the range of 8 to 14 inches from the proximal end.

* * * * *